Feb. 25, 1941.     F. W. ADAMS     2,233,155
PURIFICATION OF SILICA SANDS AND THE LIKE
Filed July 8, 1939
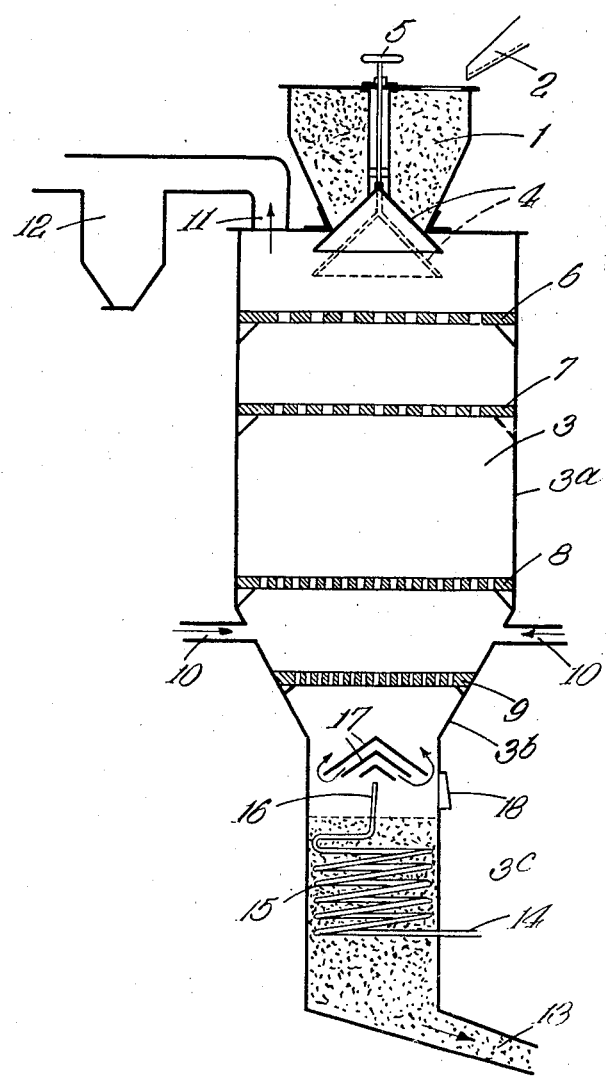
INVENTOR:
FREDERICK WILLIAM ADAMS
BY: *Haseltine, Lake & Co.*
ATTORNEYS Patented Feb. 25, 1941

2,233,155

UNITED STATES PATENT OFFICE 2,233,155

PURIFICATION OF SILICA SANDS AND THE LIKE

Frederick William Adams, Ealing, London, England, assignor to The Rockware Glass Syndicate Limited, London, England, a British company Application July 8, 1939, Serial No. 283,435
In Great Britain July 11, 1938

7 Claims. (Cl. 23—182)

This invention relates to the purification of silica sands and the like and has particular reference to the reduction of the iron content of silica sands so as to render them available for use in the production of colourless glass.

Great difficulties are experienced by glass manufacturers due to the presence of iron oxide in sands for use in glass-making because of the intense colouring power exerted by this oxide even when present in minute quantities. There are numerous deposits of silica sand in this country and abroad which would be valuable for the manufacture of high quality glass if their iron oxide content could be eliminated or substantially reduced.

The process according to the invention is effective not only to remove refractory iron-bearing films on the sand grains but also to attack highly ferruginous minerals and reduce their iron content.

According to the invention the sand or the like is passed downwardly in countercurrent to ammonium chloride vapour and a dry inert gas at a temperature above the dissociation temperature of the ammonium chloride whereby the iron oxide is attacked with the formation of volatile ferric chloride.

Owing to the fact that water is produced during the reaction, there is a tendency for the ferric chloride to form hydrates which melt at comparatively low temperatures, whereby the mass of sand becomes sticky and the process is brought to a stand-still. This drawback is overcome according to the present invention by means of a stream of hot, dry air or other inert gas, to remove the reaction gases from the reaction chamber so that hydrates of low melting point will not be formed therein. The use of air or other inert gases to force the reaction gases through the sand has several other advantageous effects. Thus it agitates the sand grains so that all the sand grains come into contact with the products resulting from the dissociation of the ammonium chloride. The time taken for the sand to pass down the reaction chamber may be controlled by variation of the gas pressure thereby ensuring maximum reduction of iron in sands differing in iron content.

Ammonium chloride vapour dissociates at approximately 350° C. and the sand and ammonium chloride should therefore be brought into contact at a temperature above 350° C. At temperatures between 400° C. and 500° C. the reaction is fairly rapid, while at temperatures over 500° C. it takes place almost instantaneously. The mechanism of the reaction may be represented by the following equation

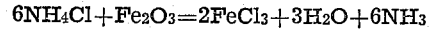
$$6NH_4Cl + Fe_2O_3 = 2FeCl_3 + 3H_2O + 6NH_3$$

It is an important feature of the invention that the ammonium chloride used in the process may be recovered from the reaction gases. Thus, the latter may be passed into water whereby the iron is precipitated as ferric hydroxide while the ammonium chloride remains in solution. The mechanism of the reaction may be represented by the following equation

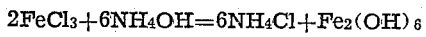
$$2FeCl_3 + 6NH_4OH = 6NH_4Cl + Fe_2(OH)_6$$

The ferric hydroxide is allowed to settle, whereupon the ammonium chloride solution is run off and the ammonium chloride recovered by crystallisation.

It is also an important feature of the invention that the purified hot sand may be used to heat up the air which is to be used for forcing the reaction gases through the sand and may also advantageously be used to heat up fresh sand to bring it to the required reaction temperature.

The process according to the invention may be carried out in any convenient apparatus in which it is possible to secure a high degree of contact between the particles of sand and the reaction gases and also to recover the ammonium chloride. An example of a suitable apparatus for carrying the invention into effect will now be described with reference to the accompanying drawing.

The sand is heated in any suitable manner and is fed to the feed hopper 1 by means of the chute 2. The hot sand then passes into the reaction chamber 3 which is made of any suitable material not attacked by the reaction gases. The reaction chamber comprises an upper cylindrical part 3a, an intermediate, conically tapering part 3b and a lower cylindrical part 3c of smaller diameter than the upper cylindrical part. The upper cylindrical part 3a and the intermediate conically tapering part 3b form the reaction chamber proper, while the lower cylindrical part 3c acts as a receiver for the treated sand. The rate at which sand is supplied to the reaction chamber is determined by the position of the cone-shaped control member 4, which in the drawing is shown in the closed position in full lines and in the open position in broken lines. The position of the control member 4 relative to the hopper, and thus the rate at which sand is supplied to the reaction chamber, may be adjusted by means of the screw-threaded spindle 5. In order to break the fall of the sand through the reaction chamber, the latter is provided with a series of perforated plates 6—9, the perforations in which progressively diminish in size but increase in number from the top to the bottom plate, so that more resistance is progressively offered to the passage of the sand by the respective perforated plates. A pair of perforated plates are provided in the upper part of the reaction chamber and another pair of perforated plates in the lower part thereof. Particularly good results are obtained if the distance between the two pairs of plates is approximately twice the distance between the plates of each pair of plates. The disposition and size of holes in the plates together with the point at which the hot air is admitted allow for the complete removal of any volatile chlorides from the treated sand. This is important, since the occurrence of small quantities of ammonium chloride or ferric chloride in the treated sand would be detrimental to its use for the manufacture of colourless glass.

The ammonium chloride vapour is admitted above the bottom plate at 10, as indicated by the arrows, and passes upwardly through the reaction chamber in countercurrent to the hot, descending sand, whereby the desired reaction is caused to take place. The reaction gases pass out of the reaction chamber at 11, as indicated by the arrow, into a dust box 12, where particles of sand taken over by the reaction gases are retained. In this way, a more evenly graded product of greater suitability for glass-making will result. The treated sand after passing through the bottom plate collects in the lower cylindrical part 3c and is withdrawn at 13, at such a rate that the level of the sand in the lower cylindrical part is maintained constant.

The fall of sand through the reaction chamber is controlled by supplying dry air at the bottom thereof. Thus the dry air enters the chamber at 14 and passes through coils 15 which are disposed in the hot treated sand in the lower cylindrical portion 3c of the reaction chamber. The air is thus heated and passes into the reaction chamber proper at 16 and is distributed over the plate 9 by means of the cone shaped baffle plates 17. The hot, dry air then passes upwardly through the reaction chamber and serves to increase the time of contact between the sand particles and the products resulting from the dissociation of the ammonium chloride vapour by supporting the sand particles in the reaction chamber and thus increasing the time taken by the sand particles in passing downwardly therethrough. The hot, dry air passing upwardly also serves to remove the water vapour formed during the reaction, and generally to sweep the final reaction gases out of the reaction chamber.

By adjusting the position of the control member 4 and the pressure of the air admitted at 14, the time of contact between the sand particles and the products resulting from the dissociation of the ammonium chloride vapour may be varied at will. An inspection door is provided at 18.

The following are results obtained by practising the process according to the invention:

|   | Per cent |
|---|---|
| (1) Original iron content | 0.049 |
| After treatment for three minutes with ammonium chloride vapour at 400° C. the iron oxide content was reduced to | 0.024 |
| (2) Original iron content | 0.12 |
| After treatment for five minutes with ammonium chloride vapour at 500° C. the iron oxide content was reduced to | 0.023 |

Although the invention has been described more particularly applied to the treatment of silica sands, it is to be understood that it may be applied to the treatment of other substances such as china clays or barytes for the purpose specified. The expression "and the like" as used herein is intended to cover such other applications of the invention.

What I claim and desire to secure by Letters Patent of the United States is:

1. A process for the treatment of silica sands for the reduction of their iron content, comprising passing hot sand downwardly in countercurrent to ammonium chloride vapour and a dry inert gas at a temperature above the dissociation temperature of ammonium chloride vapour, whereby iron oxide contained in the sand is attacked with the formation of volatile ferric chloride, the inert gas serving to prevent the formation of low melting point hydrates.

2. A process for the treatment of silica sands for the reduction of iron oxide contained therein, in which hot sand is allowed to fall in countercurrent to ammonium chloride vapour and dry air at a temperature above the dissociation temperature of ammonium chloride vapour whereby the iron oxide is reduced to volatile ferric chloride, the air serving to prevent the formation of low melting point hydrates.

3. A process for the reduction of the iron content of silica sands, in which hot sand is allowed to pass downwardly in countercurrent to ammonium chloride vapour and hot, dry air at a temperature above 400° C. whereby iron oxide contained in the sand is reduced to volatile ferric chloride, without the formation of low melting point hydrates.

4. A process for reducing iron oxide contained in silica sand, in which hot sand is allowed to pass downwardly in countercurrent to ammonium chloride vapour and hot dry air, the temperature of the sand and the air being correlated to ensure a temperature of over 500° C., whereby the iron oxide is reduced to volatile ferric chloride, the hot dry air preventing the formation of low melting point hydrates.

5. A process for the reduction of the iron content of silica sands, in which hot sand is allowed to pass downwardly in countercurrent to ammonium chloride vapour and hot dry air at a temperature above the dissociation temperature of ammonium chloride vapour, whereby iron oxide contained in the sand is reduced to volatile ferric chloride, the reaction gases being passed into water, whereby the iron is precipitated as ferric hydroxide, while the ammonium chloride remains in solution and is recovered by crystallisation from a saturated solution after the removal of the ferric hydroxide.

6. A process for the reduction of the iron content of silica sands in which hot sand at a temperature above the dissociation temperature of ammonium chloride vapour is introduced to the upper part of a reaction chamber and allowed to fall downwardly therein through a series of perforated plates disposed in said chamber, in countercurrent to ammonium chloride vapour and hot dry air passed upwardly through said chamber, whereby iron oxide contained in the sand is reduced to volatile ferric chloride, the hot treated sand accumulating in the lower part of said reaction chamber, the ammonium chloride vapour being admitted to the lower part of said reaction chamber and above the level of the hot treated sand and dry air entering the reaction chamber through the hot treated sand.

7. A process for the reduction of the iron content of silica sands, in which hot sand at a temperature above the dissociation temperature of ammonium chloride vapour is introduced to the upper part of a reaction chamber and allowed to fall downwardly therein through a series of perforated plates comprising two perforated plates in the upper part of the reaction chamber and two perforated plates in the lower part thereof, the perforations in the plates diminishing in size but increasing in number from the top to the bottom plate and the distance between the two pairs of plates being approximately twice the distance between the plates of each pair of plates, in countercurrent to ammonium chloride vapour and hot dry air passed upwardly through said chamber whereby iron oxide contained in the sand is reduced to volatile ferric chloride, the hot treated sand accumulating in the lower part of said reaction chamber, the ammonium chloride vapour being admitted to the reaction chamber between the two lowermost plates and above the level of the hot treated sand, and dry air entering the reaction chamber through the hot, treated sand.

FREDERICK WILLIAM ADAMS.